United States Patent [19]

Donges et al.

[11] Patent Number: 4,786,065
[45] Date of Patent: Nov. 22, 1988

[54] ARRANGEMENT FOR THE CONTROL OF THE REAR WHEELS OF MOTOR VEHICLES IN DEPENDENCE ON A STEERING DEFLECTION OF THE FRONT WHEELS

[75] Inventors: Edmund Donges, Fuerstenfeldbruk; Reinhard Auffhammer, Munich; Benedikt Mueller, Raubling, all of Fed. Rep. of Germany

[73] Assignee: Bayerische Motoren Werke Aktiengesellschaft, Munich, Fed. Rep. of Germany

[21] Appl. No.: 75,721

[22] Filed: Jul. 20, 1987

[30] Foreign Application Priority Data

Jul. 19, 1986 [DE] Fed. Rep. of Germany ....... 3624457

[51] Int. Cl.$^4$ ........................... B62D 6/00; B62D 7/14
[52] U.S. Cl. ......................................... 280/91; 280/99; 180/140
[58] Field of Search ............... 180/140, 141, 142, 143; 280/91, 99; 74/388 PS

[56] References Cited

U.S. PATENT DOCUMENTS

| | | | |
|---|---|---|---|
| 4,660,844 | 4/1987 | Yamamoto et al. | 280/91 |
| 4,669,567 | 6/1987 | Nakamura et al. | 280/91 |
| 4,671,523 | 6/1987 | Naumann | 280/91 |
| 4,706,979 | 11/1987 | Kawabe et al. | 280/91 |

FOREIGN PATENT DOCUMENTS

| | | |
|---|---|---|
| 3438280 | 5/1985 | Fed. Rep. of Germany . |
| 3506048 | 8/1985 | Fed. Rep. of Germany . |
| 3533487 | 3/1986 | Fed. Rep. of Germany . |

Primary Examiner—Richard A. Bertsch
Attorney, Agent, or Firm—Barnes & Thornburg

[57] ABSTRACT

An arrangement for steering the rear wheels of motor vehicles as a function of the steering deflection of the front wheels, with mechanically decoupled steering means for front and rear wheels and a transmission element for the adjustment of the steering means of the rear wheels corresponding to the steering deflection of the front wheels; the rear wheels are thereby adjusted in the same direction as the direction of the front wheels only after the lapse of a short period of delay time whereby the delay time is the smaller and the steering deflection of the rear wheels in relation to the front wheels the larger the higher the driving velocity.

8 Claims, 6 Drawing Sheets

VELOCITY-DEPENDENT PARAMETERS

CV=90000. [N/rad] CH=120000. [N/rad] MVA=824.[kg] MHA=609.[kg]
LG=2.52[m] THETAZ=2375. [kg*m**2]

CV=90000.[N/rad] CH=120000.[N/rad] MVA=824.[kg] MHA=609.[kg]
LG=2.52 [m] THETAZ=2375.[kg*m**2]

CV=90000. [N/rad] CH=120000. [N/rad] MVA=824. [kg] MHA=609. [kg]
LG=2.52 [m] THETAZ=2375. [kg*m**2]

ARRANGEMENT FOR THE CONTROL OF THE REAR WHEELS OF MOTOR VEHICLES IN DEPENDENCE ON A STEERING DEFLECTION OF THE FRONT WHEELS

BACKGROUND AND SUMMARY OF THE INVENTION

The invention relates to an arrangement for controlling the rear wheels of motor vehicles in dependence on a steering deflection of the front wheels, with mechanically decoupled steering means for the front and rear wheels and a transmission member for the adjustment of the steering means of the rear wheels in dependence on the steering deflection of the front wheels.

Such arrangements serve to improve the driving stability of a motor vehicle in case of a change in direction, especially at high speeds. Directional changes are brought about as a rule with the assistance of the steering means for the front wheels. An arrangement of the aforementioned type is known in the prior art in which the steering angle of the rear axle is so adjusted by way of a closed control loop that the transmission behavior of yaw velocity/steering wheel angle, respectively, course angle velocity/steering wheel angle obeys predetermined characteristics. The yaw velocity involves the change per time of the yaw angle which in turn is determined by the rotary movement of the motor vehicle about an upright axis through the center of gravity of the motor vehicle. The course angle velocity is the change per time of the course angle which again describes the direction of the tangent to the movement path of the vehicle center of gravity. The steering wheel angle is again proportional to the steering angle of the front wheel, the proportionality constant being equal to the steering transmission ratio of the front axle.

In the known arrangement, the measurement and feedback of movement magnitudes is necessary which describe the cross-dynamic vehicle reaction, preferably the yaw velocity, respectively, cross acceleration. The determination of these movement magnitudes requires, on the one hand, a sensor for a corresponding measurement magnitude, for example, the yaw velocity, respectively, cross acceleration. In addition to the increased expenditure, there results the additional difficulty that the movement magnitudes describing the vehicle reaction do not correlate exclusively to the steering wheel angle predetermined by the driver but are superimposed by interferences, for example, by reason of road surface unevennesses or side wind influences.

A further problem results from the structure of the closed control loop in the case that the calculation of the rear axle angle is to take place by means of a digital computer (for example, a microprocessor). Owing to the sequential manner of operation of the digital computer, problems with respect to the running time will result which may cause a destabilization, respectively, an oscillating behavior of the control circuit.

The present invention is concerned with a double task. On the one hand, the apparatus expenditure for an arrangement of the aforementioned type is to be kept as small as possible. On the other hand, a high degree in driving stability is to be achieved by the use of such an arrangement.

The underlying problems are solved according to the present invention in that with an adjustment of the front wheels the rear wheels are adjusted in the same direction as the front wheels only after the expiration of a short delay period and in that the delay period becomes the smaller and the deflection of the rear wheels the larger in relation to that of the front wheels the higher the driving velocity.

Movement conditions in which a vehicle approaches the limit of the driving stability or which proceed already in an unstable manner, are generally characterized by the occurrence of larger side slip angles, i.e., by a stronger discrepancy between the direction of the vehicle longitudinal axis—characterized by the yaw angle—and the movement direction, for example, of the vehicle center of gravity-characterized by the course angle. In this connection, oscillating occurrences which occur in particular within the range of higher driver velocities and proceed in a non-steady manner, are to be regarded as critical, in which the vehicle longitudinal axis and the movement direction of the vehicle center of gravity alternately intersect one another, and a side slip angle changing with its sign is caused thereby. In this condition, the great danger exists, for example, with a vehicle steered conventionally at the front axle, that already a slight correcting steering movement intended by the driver which is not in the right phase relation to the movement development, can completely de-stabilize the driving condition and cause an uncontrollable swerving movement.

The present invention is therefore concerned in particular with the task to avoid as much as possible the occurrence of a side slip angle and therewith to achieve a far-reaching identity of yaw angle and course angle movement.

This goal can be achieved advantageously with an active toe-in adjustment at the rear axle which assists the front axle steering. The steering angle of the rear axle $\delta_h$, in contrast, is derived from the steering angle of the front axle by way of a delay element:

$$\delta_h(t) = P_h \cdot \delta_v(t - T_t) \tag{1}$$

The value of the rear axle deflection angle which exists at the instant t, is therefore proportional to the value of the front axle steering angle which existed at a point in time displaced in the past by the delay time $T_t$. The two parameters co-steering factor $P_h$ and delay time $T_t$ which are vehicle specific, depend within the range of higher driving velocities (approximately above 70 km/h) as follows from the driving velocity.

The co-steering factor (rear wheel steer angle ratio) increases monotonously with the driving velocity and passes over asymptotically toward a vehicle-specific limit value for very high velocities (FIG. 1). The delay time decrease approximately hyperbolically with increasing driving velocity (FIG. 2).

In lieu of the front axle steering angle $\delta_v$, the steering wheel angle $\delta_H$ can be used in the equation (1) which is translated by the steering transmission ratio $i_L$.

$$\delta_v = \delta_H / L \tag{2}$$

In contrast to the known arrangement, the present invention involves a steering system. As a result thereof, a sensor for the cross-dynamic behavior of the vehicle can be dispensed with. The steering operation is considerably less sensitive with respect to signal running periods as they occur in the realization of the control member with the assistance of a digital computer, than the aforementioned regulating circuit or loop.

Whereas the described delay element which determines the steering angle of the rear axle from the front axle steering angle with the assistance of the two parameters, co-steering factor and delay time, will do justice far-reachingly to the aimed-at goal of as small as possible a side slip angle, an improved embodiment of the present invention will result in that for calculating the rear axle deflection angle, one will utilize, in addition to the steering angle of the front axle, also the steering angle velocity of the front axle. It is possible in this case to compensate the side slip angle during the mentioned movement of the motor vehicle, i.e., also with a change in course.

This can be achieved by a transmission element whose transmission behavior is described by the following differential equation:

$$T_1 \cdot \dot{\delta}_h(t) + \delta_h P_h \cdot [\delta_v(t) - T_D \cdot \dot{\delta}_v(t)] \quad (3)$$

This differential equation includes three vehicle specific parameters:

the co-steering factor $P_h$ already known from the delay element, a lead time constant $T_D$ and a lag time constant $T_l$.

All three parameters depend in a certain manner on the driving velocity. This inter-relationship was already described for the co-steering factor $P_h$ in the range of higher velocities which varies along (above about 70 km/h) and was already illustrated in FIG. 1.

The lead time constant $T_D$ describes with what weight the steering angle velocity of the front axle $\dot{\delta}_v$ enters into the formulating equation for the rear axle steering angle $\delta_h$. The inter-relationship of the lead time constant $T_D$ with the driving velocity is given for velocities above about 70 km/h by a hyperbolic relationship which is illustrated in FIG. 3. The minus sign in front of the term $T_D \cdot \dot{\delta}_v(t)$ on the right side of the differential equation (3) signifies that for higher driving velocities, the steering angle velocity enters with a reverse polarity into the formulating equation for the rear axle steering angle. During rapid steering operations, a temporary oppositely directed steering deflection of the rear axle may occur for a short period of time (as long as the steering angle velocity of the front axle is large) which in particular in comparison with the conventional front axle steering system but also in comparison with the above-described rear axle steering system having a time delay element, produces an improved, more rapid response of the yaw movement.

The lag time constant $T_l$ on the left side of the differential equation (3) brings about a rounding off of the abrupt adjusting movements caused by the consideration of the steering angle velocity on the right side. The dependency of the delay time constant on the driving velocity is illustrated for the range of interest in FIG. 4. The values also decrease hyperbolically in this figure with increasing driving velocity and move altogether on a significantly lower level compared to the lead time constant.

The transmission element described in the equation (3) is designated in the regulating parlance as PDT$_l$-element. A complete identity of the transmission functions of yaw velocity and course angle velocity is achieved by its use as steering element for the rear axle steering system. It follows from the theoretical derivation that an order reduction results from the identity of the two transmission functions, on the basis of which the cross-dynamics are translated into a delay element of the first order which is no longer capable of oscillation. A considerably more favorable, more rapid oscillation-free response of the motor vehicle to steering deflections of the driver is connected therewith. The theoretical derivation also shows that with increasing driving velocity an increase in stability reserves occurs and a synchronization of the time behavior of yaw- and course-movement is achieved. Subjectively, it follows for the driver that the interfering spreading of yaw velocity and cross-acceleration is avoided especially during non-steady driving maneuvers.

Finally, a further simplification can be achieved by the measures to adjust the rear wheels only beginning with a Predetermined vehicle velocity of, for example, 70 km/h corresponding to the indicated steering algorithms. It is thereby taken into consideration that the instabilities during non-steady driving maneuvers occur in a particularly annoying manner, especially at high velocities. The indicated measure thus limits the use of the steering of the rear wheels to a particular critical range of high driving velocities.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
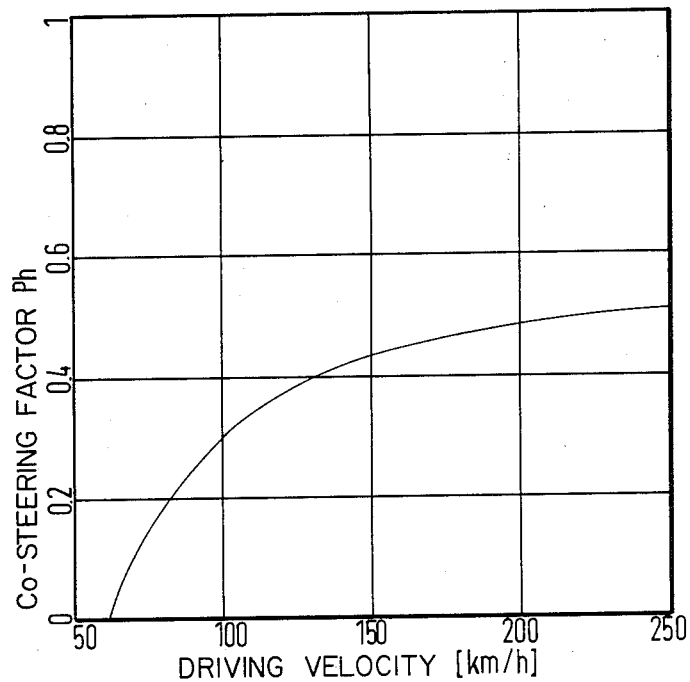
FIG. 1 is a diagram illustrating the co-steering factor $P_h$ of the velocity-dependent parameters as a function of driving velocity.
Figure 2:
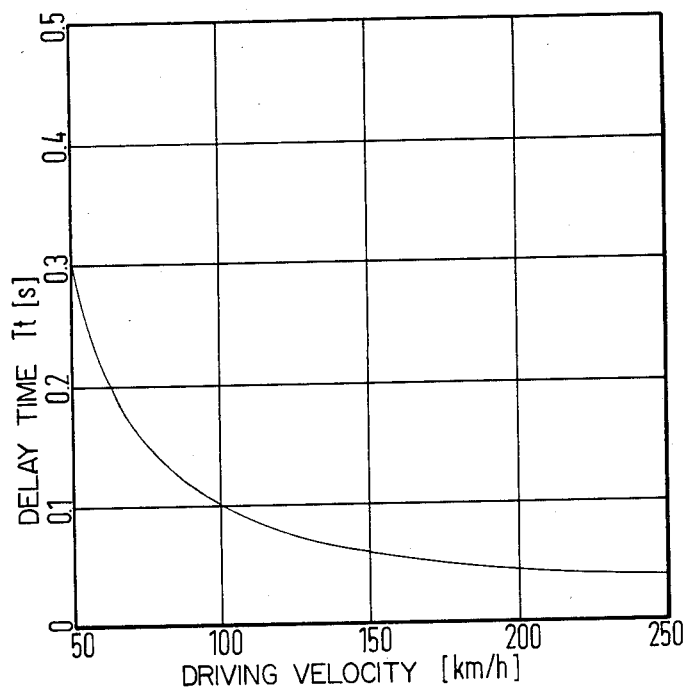
FIG. 2 is a diagram illustrating the delay-time of the velocity-dependent parameters as a function of driving velocity.
Figure 3:
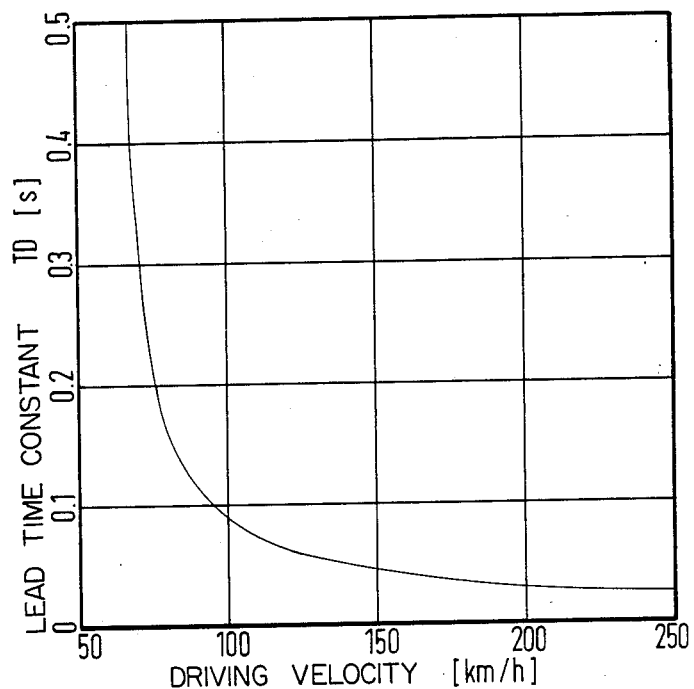
FIG. 3 is a diagram illustrating the lead-time constant TD of the velocity-dependent parameters as a function of driving velocity.
Figure 4:
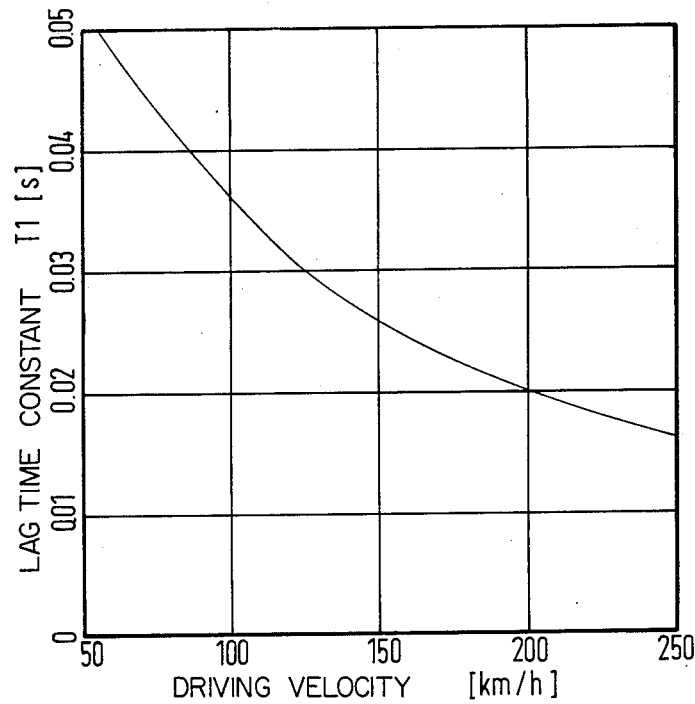
FIG. 4 is a diagram illustrating the delay-time-constant of the velocity-dependent parameters as a function of driving velocity.
Figure 5:
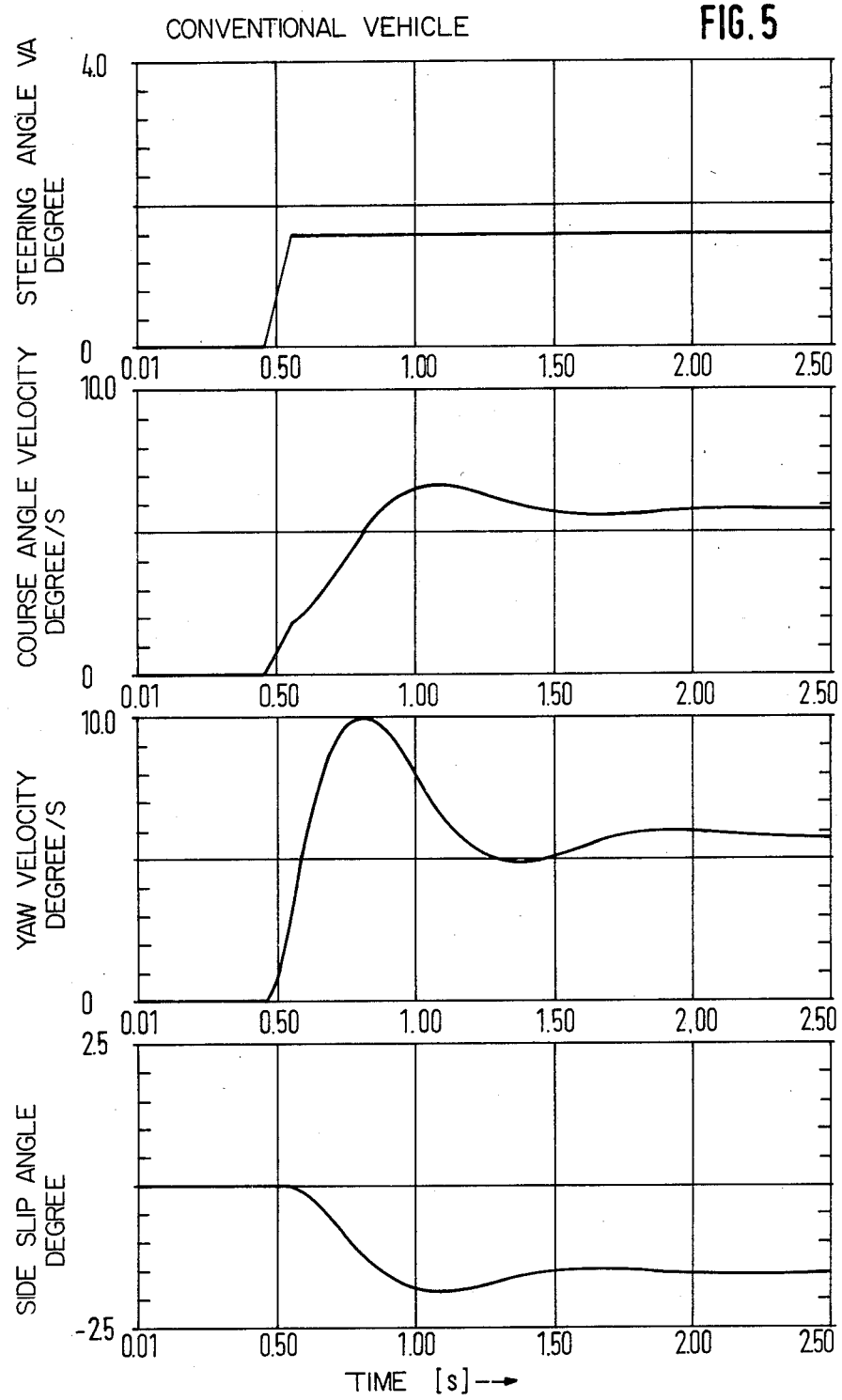
FIG. 5 is a diagram illustrating the behavior of a conventional motor vehicle (steered only at the front axle) during a steering angle change.

FIG. 5 illustrates in four diagrams the behavior with respect to time of a motor vehicle with a conventional front axle steering system with a change of the steering angle through 1.6°. The steering angle change with respect to the original straight drive is illustrated in the first diagram. The cross-acceleration resulting therefrom is illustrated in the second diagram, while the yaw velocity is illustrated in the third diagram and the side slip angle in the fourth diagram. It can be readily recognized that the vehicle has an oscillating behavior as regards the course angle velocity, the yaw velocity and the side slip angle. Subjectively, an insecurity results for the driver in controlling the vehicle which may lead to reactions, especially at high velocities, by which the driving stability of the motor vehicle can be endangered.

In contrast thereto, the motor vehicle equipped according to the present invention with a $PDT_1$ steering element in the transmission path between front and rear axle steering system is to be steered into the same circular arc as the conventional vehicle illustrated in FIG. 5 with its front axle steering system. For that purpose, a larger steering angle is necessary at the front axle because the unidirectional steering deflection at the rear axle acts in a weakening manner on the vehicle cross movement. The development with respect to time of the steering angle of the front and rear axle is illustrated in the first diagram of FIG. 6. It can be readily recognized that at the same time with the adjustment of the front axle during the steering angle increase at the front axle an oppositely directed adjustment of the rear axle and subsequent thereto a unidirectional adjustment of the rear axle is undertaken.

Figure 6:
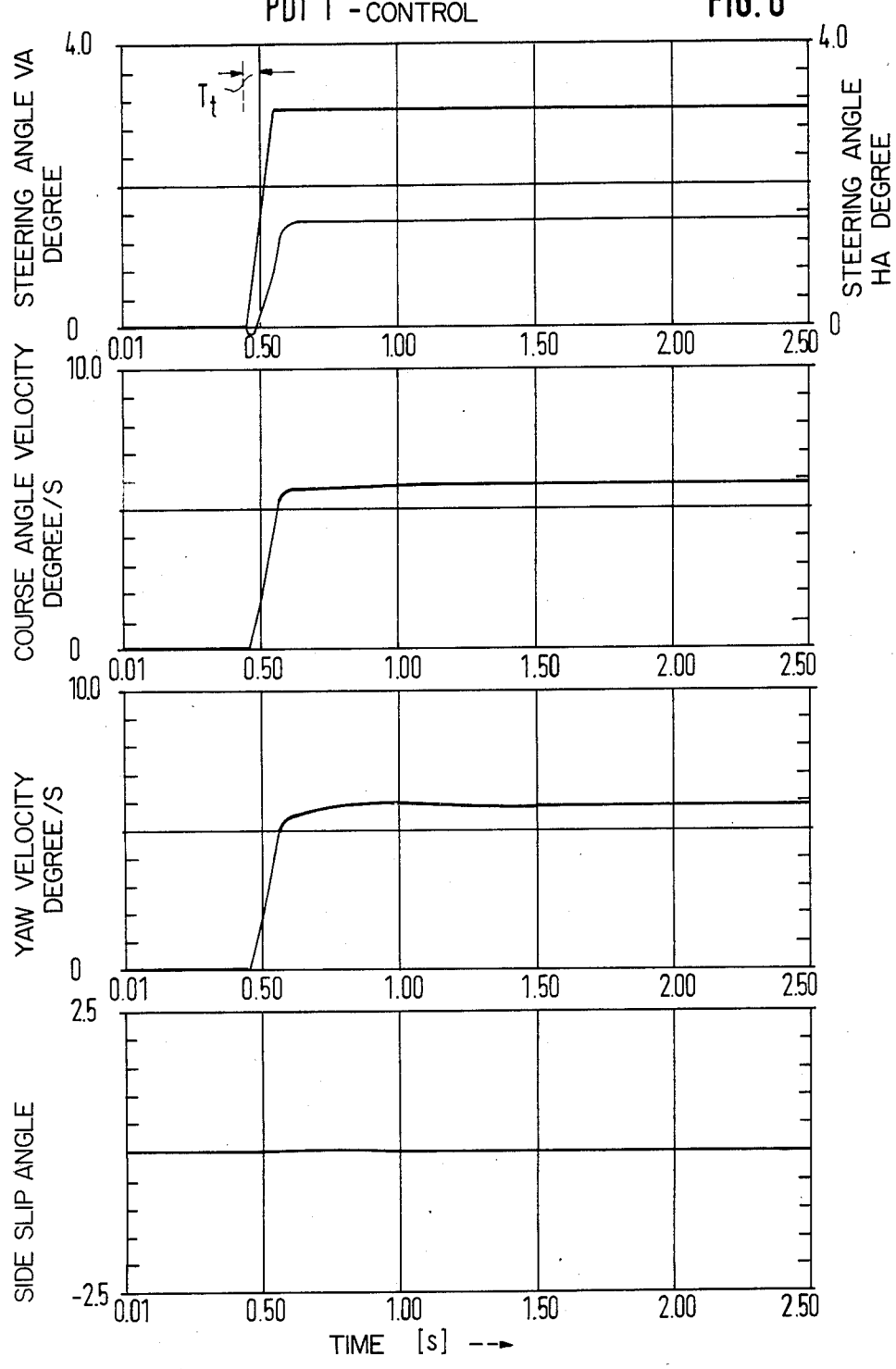
FIG. 6 is a diagram illustrating the behavior of a motor vehicle steered according to the present invention at the front and rear axle with the same steering angle change of the front axle as shown in FIG. 5.

The resulting curves of course angle velocity, yaw velocity and side slip angle as a function of time are illustrated in the farther diagrams according to FIG. 6. It can be readily recognized in this diagram that the vehicle demonstrates a stable behavior free of oscillations. This becomes noticeable subjectively for the driver in the sense of a high safety. The permanently disappearing side slip angle is thereby particularly noticeable.

A modification of the present invention consists in not adjusting the rear wheels during a delay time $T_t$ and only thereafter to adjust the rear wheels in the same direction to the front wheels according to the equation (1). The delay time $T_t$ thereby corresponds to the time during which in FIG. 6, first diagram, the oppositely directed steering deflection takes place.

As the electronic components used in the present invention are commercially available components and their interconnections to achieve the controls in accordance with the control method of this invention are within the skills of a person skilled in the art on the basis of the instant disclosure, a detailed description thereof is dispensed with herein for the sake of simplicity and brevity.

While we have shown and described several embodiments in accordance with the present invention, it is understood that the same is not limited thereto but is susceptible of numerous changes and modifications as known to those skilled in the art, and we therefore do not wish to be limited to the details shown and described therein but intend to cover all such changes and modifications as are encompasses by the scope of the appended claims.

We claim:

1. An arrangement for steering the rear wheels of motor vehicles in dependence on a steering deflection of the front wheels, comprising mechanically decoupled steering means for the front wheels and the rear wheels, and transmission means for the adjustment of the steering means of the rear wheels in dependence on the steering deflection of the front wheels, said transmission means being operable with a steering deflection of the front wheels to deflect the rear wheels in the same direction as the direction of the front wheels, only after a lapse of a brief delay time, and the delay time becoming the smaller and the steering deflection of the rear wheels the larger in relation to that of the front wheels, the higher the driving velocity.

2. An arrangement according to claim 1, wherein the rear wheels are not yet adjusted during the delay time.

3. An arrangement according to claim 2, wherein the transmission means is described by the function $$\delta_h(t) = P_h \cdot \delta_v(t - T_t)$$

where the co-steering factor $P_h$ and the delay time $T_t$ are vehicle-specific parameters whose numerical values depend on the driving velocity while $\delta_x$ represents the steering angle of the front axle and $\delta_h$ the steering angle of the rear axle.

4. An arrangement according to claim 1, wherein the rear wheels are adjusted in dependence on the steering angle of the front wheels and on the steering angle velocity of the front wheels.

5. An arrangement according to claim 4, wherein the transmission means is a $PDT_1$-control element whose transmission properties are described by the differential equation $$T_1 \cdot \dot{\delta}_h(t) + \delta_h(t) = P_h \cdot [\delta_v(t) - T_D \cdot \dot{\delta}_v(t)]$$

where the co-steering factor or rear wheel steer angle ratio $P_h$, the lead time constant $T_D$ and the lag time constant $T_1$ are vehicle-specific parameters dependent on the driving velocity and the steering angle $\delta_v$ of the front wheels and the steering velocity $\dot{\delta}_v$ of the front wheels are the input magnitudes of the control element while the steering $\delta_h$ of the rear wheels and the steering angle velocity $\dot{\delta}_h$ of the rear wheels are the output values of the control element.

6. An arrangement according to claim 5, wherein the rear wheels are adjusted only beginning with a predetermined velocity.

7. An arrangement according to claim 1, wherein the rear wheels are adjusted only beginning with a predetermined velocity.

8. An arrangement according to claim 7, wherein the rear wheels are adjusted in dependence on the steering angle of the front wheels and on the steering angle velocity of the front wheels.

* * * * *